Oct. 10, 1961   R. O. WERNER   3,003,486
REAR COMPRESSION TWO-STROKE CYCLE INTERNAL
COMBUSTION ENGINE WITH CONNECTING ROD
ACTUATED ARCUATE VALVE MEANS
Filed Dec. 24, 1959
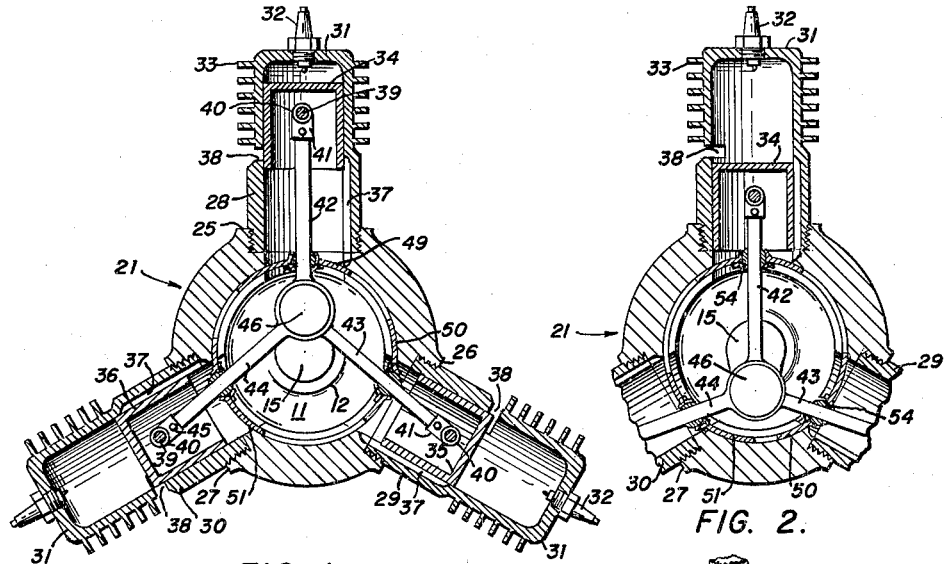
FIG. 1.
FIG. 2.
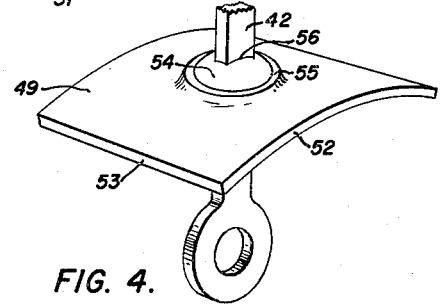
FIG. 4.
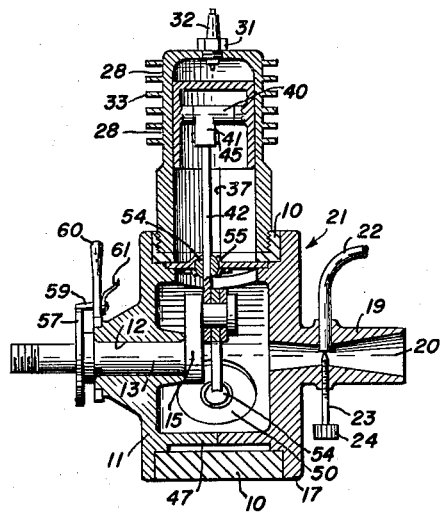
FIG. 3.
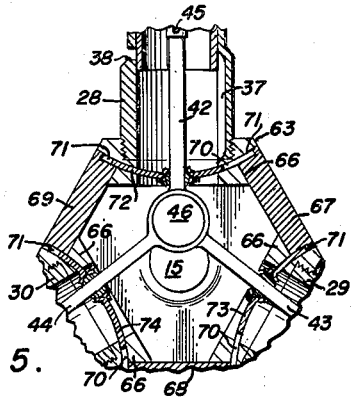
FIG. 5.
ROBERT O. WERNER
INVENTOR.
BY *Herbert J. Brown*
ATTORNEY

United States Patent Office 3,003,486
Patented Oct. 10, 1961

3,003,486
REAR COMPRESSION TWO STROKE CYCLE INTERNAL COMBUSTION ENGINE WITH CONNECTING ROD ACTUATED ARCUATE VALVE MEANS
Robert O. Werner, Arlington, Tex.
(3390 W. Union Ave., Littleton, Colo.)
Filed Dec. 24, 1959, Ser. No. 861,925
3 Claims. (Cl. 123—74)

This invention relates to internal combustion engines and has reference to a valve construction for a multicylinder engine of the two cycle type. Generally, the invention is directed to utilization of the lateral displacement of piston rods to operate valves which communicate the fuel intakes of the respective cylinders with the crankcase of an engine. Other related features of the invention provide a piston operated pressure feed fuel injection system for each cylinder and means whereby the operation of a plurality of radially arranged cylinders may be coordinated by the relationship of each piston rod to its associated cylinder.

From operational and economic points of view, simplicity in construction of internal combustion engines is desirable. Construction of an engine with a minimum number of moving parts reduces maintenance problems and minimizes the possible causes of mechanical failure. Simplication in the fabrication of each part further promotes operational reliability and greatly enhances the economic use of an engine. In its simplest form a reciprocating internal combustion engine operates in two cycles of alternating compression and combustion with exhaust and intake phases occurring after combustion. Efficiency of an engine of this type is dependent in a large measure upon the effectiveness with which exhaust gases may be evacuated from a cylinder and replaced with a combustible mixture in a relatively short interval of time before commencement of the compression stroke. Because this brief span is critical to the efficiency of the engine, positive syncronization of the position of the piston with respect to a valve mechanism is essential. One means of maintaining this positive relationship is construction of the valves as integral parts of the cylinder chamber so that they may be opened and closed by the piston itself. In such an arrangement part of a cylinder is frequently made to communicate intermittently with the crank case which serves as a conduit for the combustible mixture of fuel and air. In this construction the down stroke of the piston, in coaction with a check valve, compresses the mixture within the crankcase and provides compressive force for recharging the combustion chamber. Obviously, the compression attainable for this purpose decreases with an increase in the effective volume of the crankcase. As a practical matter, limitation of the size of the crankcase also limits stroke length and ultimately yields a reduction in attainable compression. When a plurality of cylinders communicates with a crankcase the compression of one piston is at least partially offset by the suction of another and the described arrangement becomes inoperative.

An object of the present invention is to provide a valve arrangement for two cycle engines wherein the feed compression area for combustible gases may be substantially limited to the lower portion of a cylinder to be recharged.

Another object of the invention is to provide economical means whereby valves integrally constructed with the cylinders of a multicylinder two cycle engine may be utilized in conjunction with a crankcase fed fuel intake system.

A further object of the invention is to provide a two cycle engine having a crankcase used as a fuel mixture conduit and wherein the dimensions of the crankcase do not limit the compressive force of a fuel feed system.

Another object of the invention is to provide valve means controlling fuel intake and feed compression of a two cycle engine and which means is operated by the lateral motion of the engine's piston rods.

Another object of the invention is to provide such construction for a two cycle engine as will permit a plurality of valves to be seated in a single arcuate channel within the crankcase of the engine.

A further object of the invention is to provide a valve of the type described which consumes little power in its operation and which forms an effective seal when closed.

These and other objects will become apparent from the following description and the accompanying drawing, wherein:

FIGURE 1 is a transverse sectional view of the invention showing the position of its piston rods and valves when its eccentric shaft is at a particular position.

FIGURE 2 is a fragmentary transverse sectional view of the invention showing relative positions of its components when its eccentric shaft has rotated 180° from the position illustrated in FIGURE 1.

FIGURE 3 is a longitudinal sectional view of the invention shown with its moving components positioned as in FIGURE 1.

FIGURE 4 is a perspective view of a valve member of the invention.

FIGURE 5 is a fragmentary transverse sectional view of an alternate construction of the invention.

In the drawing, a cylindrical crankcase housing 10 receives and is attached to a forward face place 11 at one of its ends. A journal box 12 is integrally constructed with the forward face plate 11 and receives a shaft 13 disposed with its axis of rotation coinciding with the principal axis of the cylindrical housing 10. A shoulder 14 on the shaft 13 bears against the forward end of the journal box 12 and a crank 15 perpendicularly positioned with respect to the shaft is attached thereto and bears against the rearward end of the journal box 12 within the housing 10. A crank pin 16 is secured to and projects rearwardly from the outer end of the crank 15 where it is disposed with its axis parallel to the axis of the shaft 13. A rear face plate 17 is secured to the rearward end of the housing 10. A carburetor 18 is constructed as a part of the rearward face plate 17 and includes an air intake tube 19 projecting rearwardly from the rearward face plate 17 and having a venturi passageway 20 communicating the rearward end of the air intake tube 19 with a crankcase 21 comprising the housing 10 and the forward and rearward face plates 11 and 17. At the waist of the venturi passageway 20 a fuel line 22 extends through a wall of the air intake tube 19; a needle valve 23 passes through and threadedly engages the opposite wall of the air intake passage 19 and adjustably extends to near engagement with the adjacent end of the fuel line 22. An adjustment knob 24 is shown attached to the exterior end of the needle valve 23.

The outer surface of the housing 10 includes three cylinder seats 25, 26 and 27 comprising flat surfaces symmetrically spaced about the periphery of the housing and with each disposed in tangential relationship to the outer curvature of the housing. Cylinders 28, 29 and 30 are respectively received and held in threaded engagement in recesses within the cylinder seats 25, 26 and 27 and the cylinders project radially outward from the crankcase 21 so that their axes lie in a common plane and form angles of 120° with one another. The bore of each cylinder is continued through the housing 10 into the interior of the crankcase 21. The head 31 of each cylinder 28, 29 and 30 is closed and carries a spark plug 32; but it is to be understood that glow plugs or other ignition devices may be used with the invention. Exteriorly of the crankcase 21 cooling fins 33 are carried on the outer walls of each cylinder 23, 29 and 30. Pistons 34, 35 and 36, each comprising a tubular member closed at its outer end, are respectively positioned within the cylinders 28, 29 and 30 and make pressure tight contact with the interior walls thereof. A longitudinal recess 37 is formed in the interior wall of the inner end of each cylinder and is continued in the wall of the bore in the crankcase which forms a continuation thereof. The combined length of the recess 37 within each cylinder and adjacent bore is slightly greater than the axial dimension of each piston 34, 35 and 36, and the described recesses constitute by-pass passageways communicating the interior of each piston and the area immediately therebeneath with the upper portions of each cylinder when the respective pistons are positioned at the inner limits of the cylinders. An exhaust port 38 is formed through the wall of each piston at a location opposite the recess 37 and longitudinally outward thereof.

Within each piston 34, 35 and 36, a wrist pin 39 disposed parallel to the crankshaft 13 passes through the axis of the piston and is connected to opposite interior walls thereof. A sleeve 40 is rotatably positioned about each wristpin 39, and a box 41, integral with each sleeve, projects perpendicularly to the axis thereof. Piston rods 42, 43 and 44, are respectively positioned within the boxes 41 carried by the sleeves 40 and are there secured by pins 45 passing through the boxes and the piston rod ends. Each piston rod 42, 43 and 44 extends inwardly of its described attachment to one of the pistons 34, 35 and 36 to pivotal attachment to the crank pin 16. It will be noted that the piston rods are not in coplanar relationship with one another, but each is longitudinally offset from the others and their inner ends are adjacently formed about the crank pin 16. A retainer plate 46, larger in diameter than the crank pin 16, is detachably secured to the rearward end of the crank pin and prevents longitudinal displacement of the piston rods 42, 43 and 44.

A forward cylindrical flange 47, coaxial with the housing 10, extends from the rearward surface of the forward face plate 11 interiorly of the crankcase 21 to a termination approximately midway between the forward and rearward face plates 11 and 17. The forward cylindrical flange 47 is positioned between and spaced from the interior surface of the housing 10 and the path of the crank-pin 16 as defined by rotation of the shaft 13. A rearward cylindrical flange 48, identical in dimensions to the forward cylindrical flange 47 and in axial alignment therewith, is attached to the forward surface of the rearward face plate 17 and extends therefrom to abutment with the forward cylindrical flange. The bore of each cylinder 28, 29 and 30 and adjacent cylinder seat is continued through the abutting portions of the forward and rearward cylindrical flanges 47 and 48 to accommodate the pistons rods.

Within the annulus which constitutes a slideway between the tubular housing 10 and the forward and rearward circular flanges 47 and 48, three arcuate valve plates 49 and 50 and 51 are slidably positioned in sealing contact with the tubular housing and the cylindrical flanges. Each valve plate is positioned in substantial axial alignment with one of the cylinders 28, 29 and 30 and the arcuate edges 52 of each cylinder plate are greater in length than the diameter of the cylinder bore. By reference to FIGURE 4, which is an enlarged perspective view of one of the valve plates 49, 50 and 51, it will be seen that each valve plate is fabricated from a rectangular plate of stock which is then curved along its greatest dimension which corresponds to its arcuate edge 52. At a location equidistant between the arcuate edges 53 of each valve plate 49, 50 and 51, but closer to one longitudinal edge 53 than the other, a spherical bearing 54 is positioned within each valve plate 48, 49 and 50 and is circumferentially held for sealed universal rotation by a rim socket 55 formed in the adjacent edge of the valve plate. Each spherical bearing 54 is provided with a channel 56 passing through its center and adapted to receive one of the piston rods 42, 43 and 44 in pressure tight sliding contact.

A rotor 57 is carried by the shaft 13 forwardly of the shoulder 14. An insulated stator ring 58 is adjustably mounted to the journal box 12 forwardly of the forward face plate 11 and is there positioned so that the brushes 59 make running contact with the periphery of the commutator ring 57. A spark advance adjustment lever 60 is attached to and projects radially from the stator ring 58, and an electrical lead 61 extends from each of the brushes 59 to appropriate components of an ignition system (not shown).

In an alternate construction of the invention, as illustrated in FIGURE 6, a hexagonal housing 62 replaces the cylindrical housing 10 previously described. The hexagonal housing 62 is constructed of three cylinder seat plates 63, 64 and 65 having grooved longitudinal edges 66 adapted to receive three spacer plates 67, 68 and 69 positioned therebetween. Each cylinder seat plate carries a cylinder 28, 29 and 30 and is provided with a concave transverse slideway 70 inwardly of and in substantial axial alignment with its associated cylinder. Adjacently inward portions of the longitudinal edges 71 of the spacer plates 67, 68 and 69 are correspondingly recessed. Concavely formed valve plates 72, 73 and 74, corresponding except for opposite curvature to the valve plates 49, 50 and 51, previously described, are respectively positioned within the slideways 70 and receive the piston rods 42, 43 and 44 through channels 56 in spherical bearings 54 held within rim sockets 55 constructed integrally with the valve plates.

In operation, a mixture of fuel and air, properly proportioned by adjustment of the needle valve 23, is drawn into the crankcase 21 from the carburetor 18. With reference to FIGURES 1, 2 and 5, the crank 15 travels in a clockwise direction about the axis of rotation of the crankshaft 12 and carries with it the inward ends of the piston rods 42, 43 and 44 which pass respectively through the valve plates 49, 50 and 51 slidably positioned in the annulus between the circular flanges 47 and 48 and the cylindrical housing 10. With specific reference to the uppermost cylinder 28, the piston 34 is shown in FIGURE 1 at its highest point of travel at the end of its compression stroke. With the piston 34 in this position and the stator ring 58 properly positioned about the journal box 12, the spark plug 32 produces an ignition spark which commences a combustion stroke driving the piston inwardly and simultaneously rotates the crank 15 and shaft 13. During the combustion stroke the valve plate 49 blocks communication between the cylinder 28 and the crankcase 21, and fuel mixture within the lower portion of the cylinder 28 is compressed between the piston 34 and the valve plate 49. As the piston 34 nears the inward termination of its travel the exhaust port 38 is uncovered by the cylindrical wall of the piston and exhaust gases under pressure are permitted to escape into the atmosphere. At the end of the combustion stroke, as illustrated in FIGURE 2, the upper termination of the longitudinal recess 37 is uncovered by the wall of the piston 34 and the compressed mixture previously confined in the lower portion of the cylinder 28 is permitted to escape into the upper portion where it scavages and displaces remaining exhaust gases. As the crank 15 continues its clockwise rotation the lower end of the piston rod 42 is carried to the left by the crank pin 16 and the valve plate 49 is carried in a counterclockwise direction which opens communication between the cylinder 28 and the crankcase 21. Hence, as fuel mixture in the upper portion of the cylinder is compressed by the piston 34, more fuel mixture is drawn from the crankcase and is replenished in the lower portion of the cylinder. As the piston 34 nears completion of its compression stroke, the lower end of the piston rod 42 is carried back to the right and the plate valve 49 once again blocks communication between the cylinder 28 and the crankcase 21.

In like manner each of the plate valves 49, 50 and 51 permits communication between its associated cylinder 28, 29 and 30 and the crankcase 21 only during the compression stroke so that no compression is exerted upon the fuel mixture within the crankcase and a substantially steady stream of air is drawn through the venturi 20 of the carburetor 18. While three cylinder construction is shown in the accompanying drawing, it will be readily apparent to those skilled in the art that any number of cylinders may be so utilized.

The invention is not limited to the exemplary construction herein shown and described, but may be made in various ways within the scope of the appended claims.

What is claimed is:

1. An internal combustion engine comprising: a housing, a forward face plate attached in sealing engagement to one end of said housing, a shaft journaled to said forward face plate, a crank on said shaft interiorly of said housing, a crank pin carried by said crank within said housing and disposed with its axis parallel to the axis of said shaft, a cylinder exteriorly mounted on said housing and having its axis disposed perpendicularly to said axis of said shaft and having its bore in communication with the interior of said housing, a piston within said cylinder, a bypass within the wall of said cylinder and adapted to communicate upper and lower portions of said cylinder when said piston is at the lower limit of travel within said cylinder, an exhaust port in the wall of said cylinder at a position farther from said crank shaft than the outer termination of said bypass, a rearward face plate in sealing engagement with the other end of said housing, a cylindrical flange coaxially disposed with said housing and around said crankshaft, and spaced interiorly from said housing and extending between said forward and said rear face plates, an arcuate valve plate slidably positioned in the annulus between said flange and said housing and making sliding contact therewith, an opening in said flange aligned with said cylinder, a piston rod pivotally connected to and extending between said piston and said crank pin, an opening in said valve plate slidably receiving said piston rod, means sealing said opening in said valve plate about said piston rod, and carburation means communicating with said crankcase.

2. The invention as defined in claim 1 and wherein said opening in said valve plate includes a rim socket peripheral to said opening and integral with said valve plate, a spherical bearing in said rim socket, and an opening through said bearing slidably receiving said piston rod.

3. In a two cycle internal combustion engine including a crankcase and a cylinder communicating with said crankcase, an arcuate slideway within said crankcase beneath said cylinder, said arcuate slideway being coaxial with reference to the crankshaft of said engine, a valve plate slidably positioned within said slideway for motion transverse to the crankshaft of said engine, an opening in said valve plate nearer one transverse edge than the opposite transverse edge thereof slidably receiving a piston rod of said engine, a piston within said cylinder, means pivotally connecting said piston and said piston rod, and a bypass within a wall of said cylinder adapted to communicate upper and lower portions of said cylinder when said piston is at the lower limit of travel within said cylinder.

References Cited in the file of this patent

UNITED STATES PATENTS

| 1,132,386 | Rigaud | Mar. 16, 1915 |
| 1,170,059 | Fredlund | Feb. 1, 1916 |
| 1,283,276 | O'Brien | Oct. 29, 1918 |
| 1,977,657 | Watson | Oct. 23, 1934 |

FOREIGN PATENTS

| 9,360 | Great Britain | Apr. 21, 1913 |
| 257,028 | Germany | Feb. 24, 1913 |